# United States Patent [19]

Goodrich et al.

[11] Patent Number: 4,871,450
[45] Date of Patent: Oct. 3, 1989

[54] WATER/WASTEWATER TREATMENT APPARATUS

[75] Inventors: James A. Goodrich, Irvine, Calif.; Steven J. Medlar, Washington Crossing, Pa.

[73] Assignee: Camp Dresser & McKee, Inc., Boston, Mass. ; a part interest

[21] Appl. No.: 87,326

[22] Filed: Aug. 20, 1987

[51] Int. Cl.⁴ ...................... C02F 1/24; B01D 17/035
[52] U.S. Cl. ..................................... 210/151; 210/196; 210/218; 210/221.2; 210/258; 261/121.1 122
[58] Field of Search ............... 210/703, 706, 707, 150, 210/151, 196, 201, 205, 209, 218, 220, 221.2, 258; 261/95, 96, 121.1, 122; 209/164–170

[56] References Cited

U.S. PATENT DOCUMENTS

| | | | |
|---|---|---|---|
| 2,780,360 | 2/1957 | Bon et al. | 210/703 |
| 3,959,131 | 5/1976 | Ramirez et al. | 210/707 |
| 3,986,954 | 10/1976 | George et al. | 210/706 |
| 4,146,472 | 3/1979 | Treyssac | 210/703 |
| 4,160,737 | 7/1979 | Pielkenrood | 210/221.2 X |
| 4,190,522 | 2/1980 | Trä | 210/221.2 X |
| 4,216,085 | 8/1980 | Chittenden | 210/706 X |
| 4,328,107 | 5/1982 | Wright | 210/703 |
| 4,620,926 | 11/1986 | Linck et al. | 210/221.2 |
| 4,790,944 | 12/1988 | Gordon et al. | 210/221.2 X |

*Primary Examiner*—Tom Wyse
*Attorney, Agent, or Firm*—Frank D. Gilliam

[57] ABSTRACT

A method and apparatus for removing volatile organic contaminants from water. Water to be treated is mixed with a small proportion of higher pressure gas (air, ozone, etc.)-saturated water in a static mixer causing the release of a very large number of very fine gas (air, ozone, etc.) bubbles in the mixture. The mixture is directed into a chamber which has a device, such as a transverse perforated plate, to reduce water pressure. The pressure drop, which need only be about 10 psi, causes the volatile organic contaminants to enter the vapor phase and, through mass transfer absorption, mix with the gar bubbles. The bubbles rise to a free headspace at the top of the chamber from which the now-contaminated gas can be withdrawn. The substantially decontaminated water then exits the chamber, still nearly at line pressure.

3 Claims, 1 Drawing Sheet

WATER/WASTEWATER TREATMENT APPARATUS

BACKGROUND OF INVENTION

This invention relates in general to water treatment systems and, more specifically, to a method and apparatus for removing volatile organic contaminants from water.

Treatment systems using a variety of technologies have been developed over the years to remove a variety of contaminants from water supplies, both to treat drinking water prior to use or sewage prior to reintroduction into the environment. A number of different techniques, usually involving flotation, are used to remove solid particulate material. Other methods have been developed to remove naturally occurring gaseous contaminants such as sulfur-containing gases from water. Today, many wells and other water sources have become contaminated with volatile organic compounds, such as trichloroethylene (TCE), tetrachloroethylene, petroleum hydrocarbons, and benzene, or mixtures of such compounds.

The traditional method for removing gaseous contaminants has been the packed tower air stripping method. A vertical tower, usually on the order of 20 to 30 feet high, is constructed to treat the water at atmospheric pressure. Contaminated water is pumped to the top of the tower and is allowed to cascade down over packing or plates within the tower. Air is forced upwardly through the tower by a fan to volatilize any volatile organic contaminants. The contaminant-free water is collected at the bottom of the tower and is pumped into the distribution system. The air exiting the top tower may be vented to the atmosphere or collected, dehumidified and purified (usually with activated charcoal filters) before release to the atmosphere.

While generally effective, these towers have a number of disadvantages. The towers are expensive to construct, operate and maintain. Operation is expensive because great quantities of air must be forced up against the falling water to achieve the required level of treatment and the energy needed to pump the water to the top of the tower is lost with the cascading and further energy is expended in pumping the decontaminated water back to the distribution system pressure. The high capacity fans, pumps and motors tend to require high levels of maintenance. Also, the tall towers have an adverse visual impact on the surrounding area, which may be particularly important in residential or commercial areas.

A number of other water treatment systems have been developed using air jets or bubbles to help remove contaminants, both solid and gaseous, from water. Some are flotation systems in which are bubbles are introduced into contaminated water in a manner permitting the bubbles to attach to fine solid particles and float to the top, where the accumulated foam-like layer can be skimmed off. Typical of these is the process described by Treyssac in U.S. Pat. No. 4,146,472. There, two separate flows of liquid are separated by a fine mesh grid, with particulate contaminated water above the grid and a higher pressure air saturated layer of water below the grid. Small bubbles pass upwardly through the grid and capture fine particles as they move to the surface for skimming. While this arrangement may effectively remove particulates, there is nothing to suggest removal of dissolved volatile organic contaminants. Further, this arrangement is complex, requires precise sizing and pressure relationships to prevent intermixing of flows and turbulence and is energy intensive in requiring large volumes of high pressure air-saturated water.

Various filter arrangements have been developed for removing inorganic gases, such as sulfur-containing gases, and particulates from well water or the like. Typical of these is the filter described by Kemper in U.S. Pat. No. 4,094,789. There, high pressure air and water jets are positioned to impinge on a splash plate, causing immediate and violent co-mingling of the air and water, causing at least some of the sulfur gases to mix with the air and be carried away therewith. The water then passes through a granular filter for particulate removal. This is very low volume, high energy requirement system, requiring low volume, high velocity jets of water and air.

Increasingly, water supplies, particularly wells, have been becoming contaminated with a variety of volatile organic compounds which are by-products of high technology industries. While these compounds are often present in only very small proportions, because of the high toxic or carcinogenic characteristics of some of them removal from drinking water supplies is essential.

Prior water treatment methods are often ineffective in removing volatile organic contaminates from water. Prior methods also tend to be complex, costly and either very low in capacity or require very large plants for effective utilization. Thus, there is a continuing need for an improved method and apparatus for removing volatile organic contaminants from water which can be efficiently sized for both large and small volume operations, is cost and energy efficiently and is environmentally non-intrusive.

SUMMARY OF THE INVENTION

The above-noted problems, and others, are overcome by this invention, which basically comprises mixing water from a source (e.g., a well) at standard line pressure with a small proportion of gas-saturated water at somewhat higher pressure into a chamber producing a large number of very small air bubbles distributed throughout the mixture, reducing pressure as the mixture moves across the chamber so that the organic contaminants enter the vapor phase and are picked up by the bubbles through mass transfer absorption as the bubbles rise through the water, collecting the bubbles in an open headspace at the top of the chamber, removing the now-contaminated gas from the headspace and passing the now substantially decontaminated water from the chamber to a distribution system for use. The gas may be air, ozone or other suitable gases.

This system is very effective in removing volatile organic contaminants such as trichloroethylene (TCE), tetrachloroethylene (PCE), Benzene, Toluene, Xylene, and petroleum hydrocarbons from water. As further detailed below, system parameters, such as pressure drop, proportion of gas-saturated water to main water flow, temperature, use of packing in the chamber, flow rate, etc. may be varied and optimized through simple empirical tests depending upon the specific contaminants to be removed. Where other contaminants must also be removed, such as solid particle material, the system of this invention can be used in series with other conventional devices, as desired. In general, it is preferred that this system be the last one used in series prior to distribution of the water to the consumer.

In general, it is preferred that the gas-saturated water be supplied by taking a portion (typically about 5 to 10%) of the system output water and cycling it through a pump to increase pressure and a mixer where gas such as air, ozone, or the like from a compressor is mixed with the water substantially to saturation.

While any suitable means for reducing water pressure as the mixture moves through the chamber may be used, we prefer to use a simple transverse perforated restrictor plate, preferably positioned about 25 to 40% of the chamber length from the inlet end. The perforation size and spacing will be selected according to the pressure drop desired with a given flow rate. In a typical installation, perforations will constitute from about 5 to 50 percent of the plate surface (this will vary within this range depending on the injected gas, contaminate to be removed, etc.). If desired, packing such as small perforated spherical plastic shells (which resemble "wiffle" balls) may be placed in the chamber downstream of the restrictor plate to assist in degassing the water.

Some non-volatile contaminants, such as nitrates, can be treated by this system by introducing with the gas-saturated water a chemical which will react with the nonvolatile contaminant to produce a gaseous product which will be removed with the volatile contaminants as discussed above. The reactant also could be added to the water to be treated upstream of this system through another mixer. Typically, where Dioxane (1, 4 diethylene dioxide) is present, the addition of ozone (an oxident) at the first stage will make the dioxane more volatile; air injected and mixed at the second stage will supply the necessary mass transfer to remove the organic contaminant.

Operational costs of this system are very low because of the very low head loss from one side of the system to the other. Maintenance requirements are also low since the only mechanical moving parts are the small air compressor for injecting the gas into the by-pass water and headspace and the small water recirculation pump. The system is low and compact and could be easily placed underground.

BRIEF DESCRIPTION OF THE DRAWING

Details of the invention, and of a preferred embodiment thereof, will be further understood upon reference to the drawing, wherein.

DETAILED DESCRIPTION OF THE INVENTION

Figure 1:
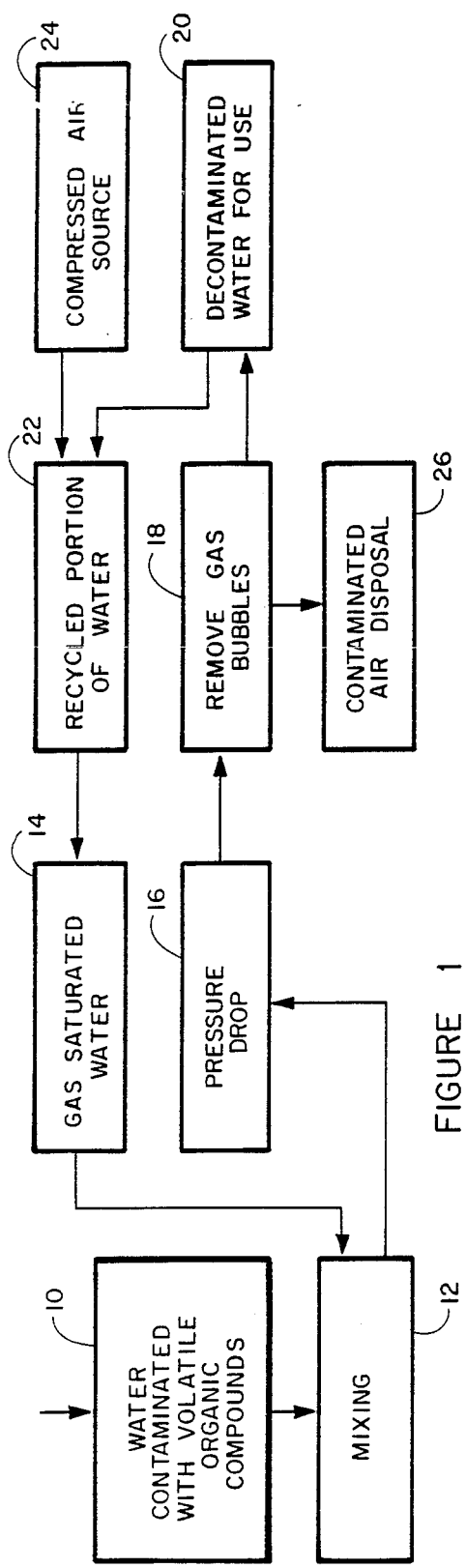
FIG. 1 is a schematic flow chart of the method of this invention.

Referring now to FIG. 1, there is seen a schematic block diagram illustrating the steps in the water treatment method of our invention.

Water from a source 10 which is contaminated with volatile organic compounds is to be treated to remove those compounds. Also, water having non-volatile contaminants which could be treated to produce volatile compounds could be so treated at a selected point between the source and the treatment system. The resulting volatile compounds would be removed with any others in the water.

Contaminated water is directed to a mixing operation 12 where it is mixed with a smaller proportion of gas (air, ozone, etc.) under higher pressure which has been saturated with air. Preferably, about 5 to 10 wt % gas-saturated water 14 is mixed with the contaminated water. Typically, the contaminated water is at a line pressure of about 60 psi and the gas-saturated water 14 is at 90 to 150 psi; or preferrably 1.5 to 2.5 times the line pressure. When mixed, the pressures equalize so that a very large number of very small gas bubbles form in the mixture from the gas-saturated water, which is supersaturated at this pressure.

The mixture is passed into a suitable chamber in which a pressure drop 16 is caused to occur. For most contaminants, a pressure drop of about 10 psi is sufficient to cause the contaminants to enter into the vapor phase, be picked up by gas bubbles through mass transfer absorption and rise through the water with the bubbles. The pressure drop can be varied depending upon the volatility of the contaminant. The more volatile the contaminant, the more effective the system will be at a given pressure drop.

The contaminant-carrying gas bubbles are removed as indicated at 18, leaving decontaminated water 20 ready for use.

This water treatment concept combines aeration mass transfer with diffused air flotation technology. The transfer of volatile organics from the liquid phase to a vapor is related the Henry's Law, which states: $P = HX$, where P is the partial vapor pressure of the contaminant, H is the Henry's Law constant and X is the concentration of the contaminant in water. Clearly, the performance of the gas stripping system depends on the partial pressure of the contaminant in the vapor phase. In a pressure system the equilibrium transfer of volatile organic compounds between the water and vapor will be affected by this same pressure. We have found that it is possible to capitalize on the change in pressure to accelerate mass transfer. Mass transfer depends on the change in pressure, the gas to water (volumetric) ratio and the organic compound volatility. Optimum conditions can be determined by simple empirical comparative tests with water samples containing any specific volatile organic compound to be removed.

For highest efficiency, the gas-saturated water 14 is produced by recycling a portion 22 of decontaminated water 20 and injecting compressed gas 24 thereinto. The gas-saturated water 14 is preferably introduced into mixing step 12 at a pressure at least about 150 to 250% of the line pressure of the contaminated water 10, generally about 40 to 60 psi greater than the original line pressure.

Gas from compressed gas source 24 is also directed into the treatment chamber (as detailed below) to maintain a headspace above the water into which the gas bubbles diffuse. The collected contaminated air 26 is disposed of by atmospheric release where permitted for the specific organic compounds involved or by purification with charcoal (GAC) filters or the like.

Figure 2:
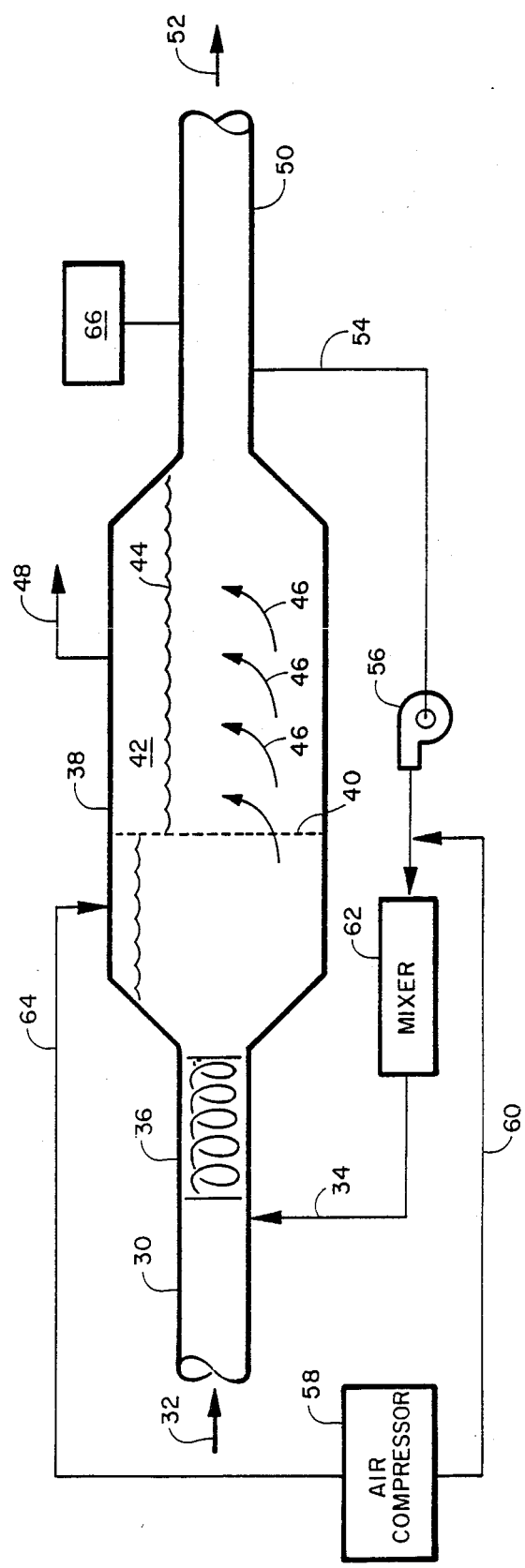
FIG. 2 is a schematic diagram of the apparatus of this invention.

FIG. 2 is schematic diagram illustrating the water treatment apparatus of this invention.

Water contaminated with volatile organic compounds from a distribution system, well or other source enters the system through pipe 30 as indicated by arrow 32. Higher pressure, gas (air, ozone, etc.)-saturated water is injected into pipe 30 through line 34 just upstream of static mixer 36. Any suitable mixing means may be used. Typical mixers include in-line static mixers or blenders available from Kenics, Inc. or Komax, Inc. Since the injected gas-saturated water is typically at about 120 psi while the source water is typically at about 70 psi, the injected water is super saturated at the mixed pressure so that a great number of very small gas bubbles immediately form.

Upon leaving static mixer 36, the mixture enters a large diameter, typically cylindrical, chamber 38. Typically, with a flow of about 700 gpm, chamber 38 may have a diameter of about 6 feet and a length of about 12 to 20 feet. The shape and size of chamber 38 may vary depending on the concentration and type of contamination, desired removal rate, etc.

A perforated restrictor plate 40 is place transversely across chamber 38 about 25 to 40% of the distance from the entrance of chamber 38. The plate 40 may have any suitable number, size and arrangement of perforations necessary to provide the desired pressure drop at the flow rate used. Generally, a 10 to 20% pressure drop is preferred across the plate 40. In some cases, a greater pressure drop may be preferred for better transfer with some contaminants. In those cases, it may be desireable to add a booster pump in pipe 30 to increase the incoming pressure to increase the pressure differential.

A headspace 42 is maintained above liquid level 44 to permit collection bubbles which are rising along lines generally indicated by arrows 46. Gas collected in headspace 42 is removed through line 48 to a purification filter (not shown) or a vent to the atmosphere.

The gas-saturated water is provided to line 34 by recycling a small proportion of the decontaminated water leaving the chamber through pipe 50 as indicated by arrow 52. The recycled water passes through line 54 to a standard boost pump 56 which increases the pressure to the selected extent. A conventional air compressor 58 injects the gas through line 60 just upstream of a static mixer 62. Air compressor 58 also supplies the gas through line 64 to maintain water level 44 at the desired height. Any conventional means may be used to sense water level 44 and control gas pressure through line 64 to maintain the desired water level. Of course, line 64 could be eliminated and water level 44 could be controlled by the rate at which gases are drawn off through line 48, although this arrangement is less effective.

A secondary vapor (or air) release device 66 is preferably provided along outlet pipe 50 to protect against gas carry-over to the downstream system.

While certain preferred dimensions, arrangements and proportions were detailed in the above description of preferred embodiments, these may be varied where suitable with similar results. For example, perforated packing may be placed in chamber 38 downstream of plate 40 to assist in degassing the water. This system may be large in size for use in large distribution systems or with wells or quite small for use in individual homes. Reactants may be added to convert non-volatile organic compounds to volatile products for removal by the system.

Other variations, ramifications and applications of this invention will occur to those skilled in the art upon reading this disclosure. Those are intended to be included within the scope of this invention as defined by the appended claims.

We claim:
1. A water treatment apparatus which comprises:
an inlet pipe adapted to receive water from a source at line pressure;
water injection means to inject higher pressure water into said inlet pipe;
static mixer means in said pipe to mix source water and injected water;
a first chamber to receive mixed water from said inlet pipe;
an outlet pipe to receive water from a second chamber;
means for withdrawing a selected percentage of the treated water at about said outlet pipe;
pump means for increasing the pressure of said withdrawn water;
gas injecting means for injecting gas into the resulting high pressure water;
mixing means for mixing said injected gas and high pressure water prior to injecting of said high pressure water into said inlet pipe by said water injection means;
a perforated plate dividing said first and second chamber positioned substantially perpendicular to the direction of water flow through said chambers and about 25 to 40% of the length of said chambers from said inlet, said plate functions to reduce the pressure between said inlet and outlet and for maintaining a first headspace above the mixed water in said first chamber adjacent to said inlet and means for maintaining a second headspace above the mixed water in said second chamber adjacent to said outlet, said second headspace being greater in volume than said first headspace for evacuating gases from said second headspace.

2. The apparatus according to claim 1 further including a quantity of perforated packing in said chamber downstream of said plate.

3. The apparatus according to claim 1 wherein said means for maintaining a headspace in said chamber comprises a high pressure gas line connected to said chamber to very the air pressure within said headspace.

* * * * *